US009895644B2

(12) United States Patent
Xia et al.

(10) Patent No.: US 9,895,644 B2
(45) Date of Patent: Feb. 20, 2018

(54) METHOD AND WET SCRUBBER FOR REMOVING PARTICLES FROM GASES

(71) Applicant: OUTOTEC (FINLAND) OY, Espoo (FI)

(72) Inventors: Jiliang Xia, Pori (FI); Robert Johansson, Skellefteå (SE); Satu Jyrkönen, Vanha-Ulvila (FI); Leif Skilling, Skellefteå (SE); Anders Gustavsson, Burträsk (SE); Lars Hedström, Stockholm (SE)

(73) Assignee: OUTOTEC (FINLAND) OY, Espoo (FI)

( * ) Notice: Subject to any disclaimer, the term of this patent is extended or adjusted under 35 U.S.C. 154(b) by 80 days.

(21) Appl. No.: 15/104,799

(22) PCT Filed: Dec. 18, 2014

(86) PCT No.: PCT/FI2014/051027
§ 371 (c)(1),
(2) Date: Jun. 15, 2016

(87) PCT Pub. No.: WO2015/092149
PCT Pub. Date: Jun. 25, 2015

(65) Prior Publication Data
US 2016/0310885 A1    Oct. 27, 2016

(30) Foreign Application Priority Data
Dec. 20, 2013    (FI) ..................................... 20136308

(51) Int. Cl.
*B01D 45/12*    (2006.01)
*B01D 47/10*    (2006.01)
(Continued)

(52) U.S. Cl.
CPC .............. *B01D 47/10* (2013.01); *B01D 45/16* (2013.01); *B01D 50/004* (2013.01); *B01D 45/12* (2013.01);
(Continued)

(58) Field of Classification Search
CPC ........ B01D 45/12; B01D 45/16; B01D 47/10; B01D 50/004; B01D 2247/08; B01D 2247/101; B01D 2247/108
(Continued)

(56) References Cited

U.S. PATENT DOCUMENTS 3,517,485 A    6/1970    Dellagnese et al.
3,597,901 A    8/1971    Heeney
(Continued)

FOREIGN PATENT DOCUMENTS

CN    2664758 Y    12/2004
CN    201988304 U    9/2011
GB    2 458 162 A    9/2009

OTHER PUBLICATIONS

International Search Report (PCT/ISA/210) dated Mar. 26, 2015, by the European Patent Office as the International Searching Authority for International Application No. PCT/FI2014/051027.
(Continued)

*Primary Examiner* — Frank Lawrence
(74) *Attorney, Agent, or Firm* — Buchanan, Ingersoll & Rooney PC

(57) ABSTRACT

Provided are a method and to a wet scrubber for removing particles from gas. The wet scrubber includes a second vertical cylindrical vessel having a second upper end for receiving an accelerated stream of liquid- and particles-laden gas from a vertically oriented venturi channel and a second lower end for feeding the accelerated stream of liquid- and particles-laden gas to a swirl generator. The
(Continued)

Figure 1:
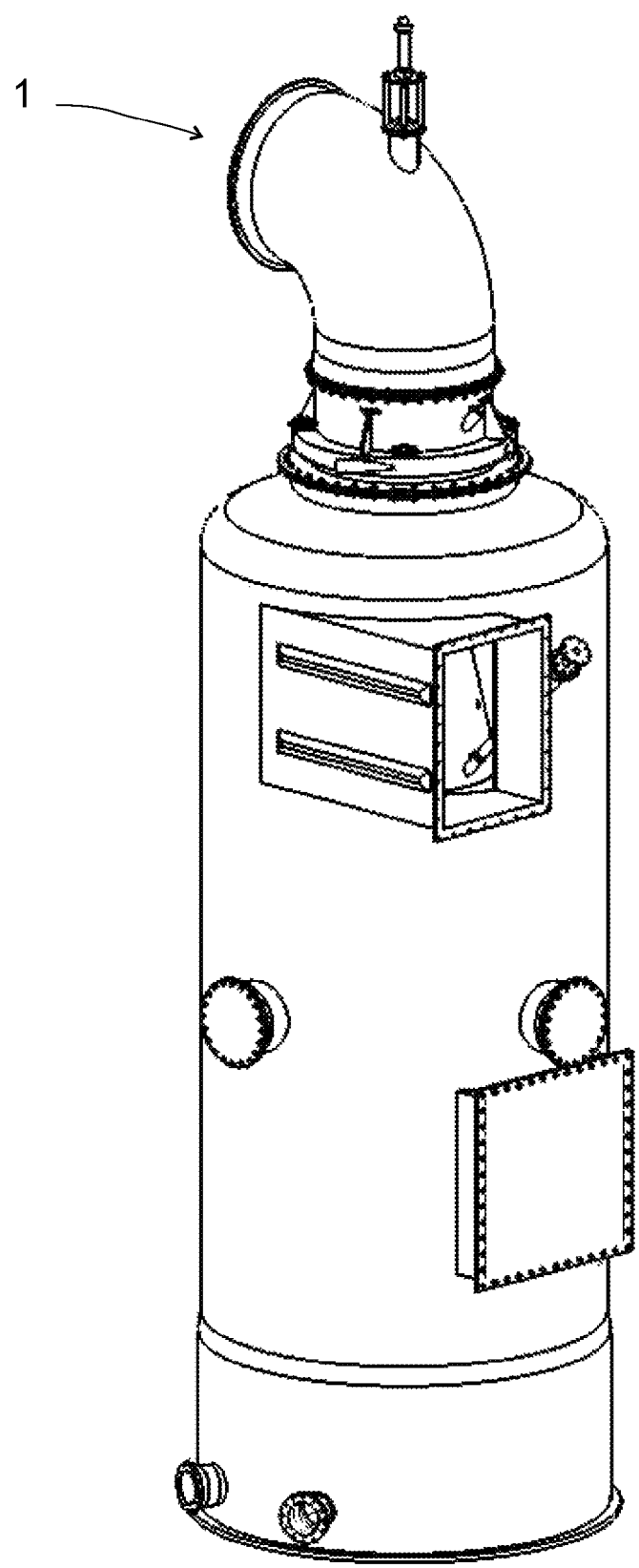

second vertical cylindrical vessel and the swirl generator are arranged in a vertical cylindrical separation space of a first vertical cylindrical vessel. The swirl generator is arranged above the liquid tank.

28 Claims, 15 Drawing Sheets

(51) Int. Cl.
  *B01D 50/00* (2006.01)
  *B01D 45/16* (2006.01)

(52) U.S. Cl.
  CPC .... *B01D 2247/08* (2013.01); *B01D 2247/101* (2013.01); *B01D 2247/108* (2013.01)

(58) Field of Classification Search
  USPC .... 95/216, 219, 230, 267, 269; 96/301, 306, 96/311, 312; 55/441, 447
  See application file for complete search history.

(56) References Cited

U.S. PATENT DOCUMENTS

| | | | | |
|---|---|---|---|---|
| 3,638,925 A | * | 2/1972 | Braemer | B01D 47/10 138/46 |
| 3,648,440 A | | 3/1972 | Egan | |
| 3,793,809 A | * | 2/1974 | Tomany | B01D 47/10 261/112.1 |
| 3,812,656 A | * | 5/1974 | Barnhart | B01D 47/10 261/116 |
| 3,933,450 A | * | 1/1976 | Percevaut | B01D 47/06 261/116 |
| 6,270,544 B1 | * | 8/2001 | Mencher | B01D 45/16 55/318 |
| 7,975,991 B2 | * | 7/2011 | Kojima | B01D 45/12 261/113 |
| 2007/0051245 A1 | | 3/2007 | Yun | |
| 2011/0048232 A1 | | 3/2011 | Langford et al. | |
| 2012/0000366 A1 | | 1/2012 | Nixdorff | |

OTHER PUBLICATIONS

Written Opinion (PCT/ISA/237) dated Mar. 26, 2015, by the European Patent Office as the International Searching Authority for International Application No. PCT/FI2014/051027.

International Preliminary Report on Patentability (PCT/IPEA/409) dated Mar. 14, 2016, by the European Patent Office as the International Preliminary Examining Authority for International Application No. PCT/FI2014/051027.

Search Report dated Jul. 1, 2014, by the Finnish Patent Office in corresponding Finnish Patent Application No. 20136308. (1 pages).

Office Action issued by the Chinese Patent Office in corresponding Chinese Patent Application No. 201480071302.6 dated Dec. 26, 2016 (19 pages including partial English translation).

* cited by examiner

METHOD AND WET SCRUBBER FOR REMOVING PARTICLES FROM GASES

FIELD OF THE INVENTION

The invention relates to a method for removing particles from gases as defined in the preamble of independent claim 1.

The invention also relates to a wet scrubber for removing particles from gases as defined in the preamble of independent claim 16.

Scrubbers are used for scrubbing gas of undesired chemicals and/or dust.

OBJECTIVE OF THE INVENTION

The object of the invention is to provide an effective method for separation of particles from gases and to provide a compact scrubber that provides for effective separation of particles from gases.

SHORT DESCRIPTION OF THE INVENTION

The method for removing particles from gases of the invention is characterized by the definitions of independent claim 1.

Preferred embodiments of the method are defined in the dependent claims 2 to 15.

The wet scrubber for removing particles from gases of the invention is correspondingly characterized by the definitions of independent claim 16.

Preferred embodiments of the wet scrubber are defined in the dependent claims 17 to 28.

In the method and in the wet scrubber, separation of particles of solid and/or liquid are separated from the gas in two stages; first in the swirl generator and thereafter in the vertical cylindrical separation space of the first vertical cylindrical vessel.

By placing the venturi channel in the vertical cylindrical separation space of the first vertical cylindrical vessel a duct for connecting the venturi channel and the vertical cylindrical separation space of the first vertical cylindrical vessel becomes unnecessary. This also makes the scrubber more compact i.e. small in size. A scrubber small in size need less space such as less floor space.

The method and wet scrubber makes also possible a self-carrying structure i.e. there is no or less need for external steel structures for carrying the wet scrubber or parts of the wet scrubber.

In the method and in the wet scrubber it is provided for so that the separated particles of solid and/or liquid after the first stage can be separated and does not need to enter into the second stage.

The method and the wet scrubber also allows the degree of separation of particles of solid and/or liquid to be adjusted by adjusting the liquid level in the liquid tank that is in fluid connection with the lower end of the first cylindrical vessel. A higher liquid level gives increased velocities for the stream exiting the swirl generator and higher separation efficiency due to increased cyclonic action. The swirl generator may have partly open bottom and the liquid level may be raised so that the partly open bottom of the swirl generator is covered with liquid, which leads to reduced wear on the bottom area of the swirl generator.

LIST OF FIGURES

Figure 2:
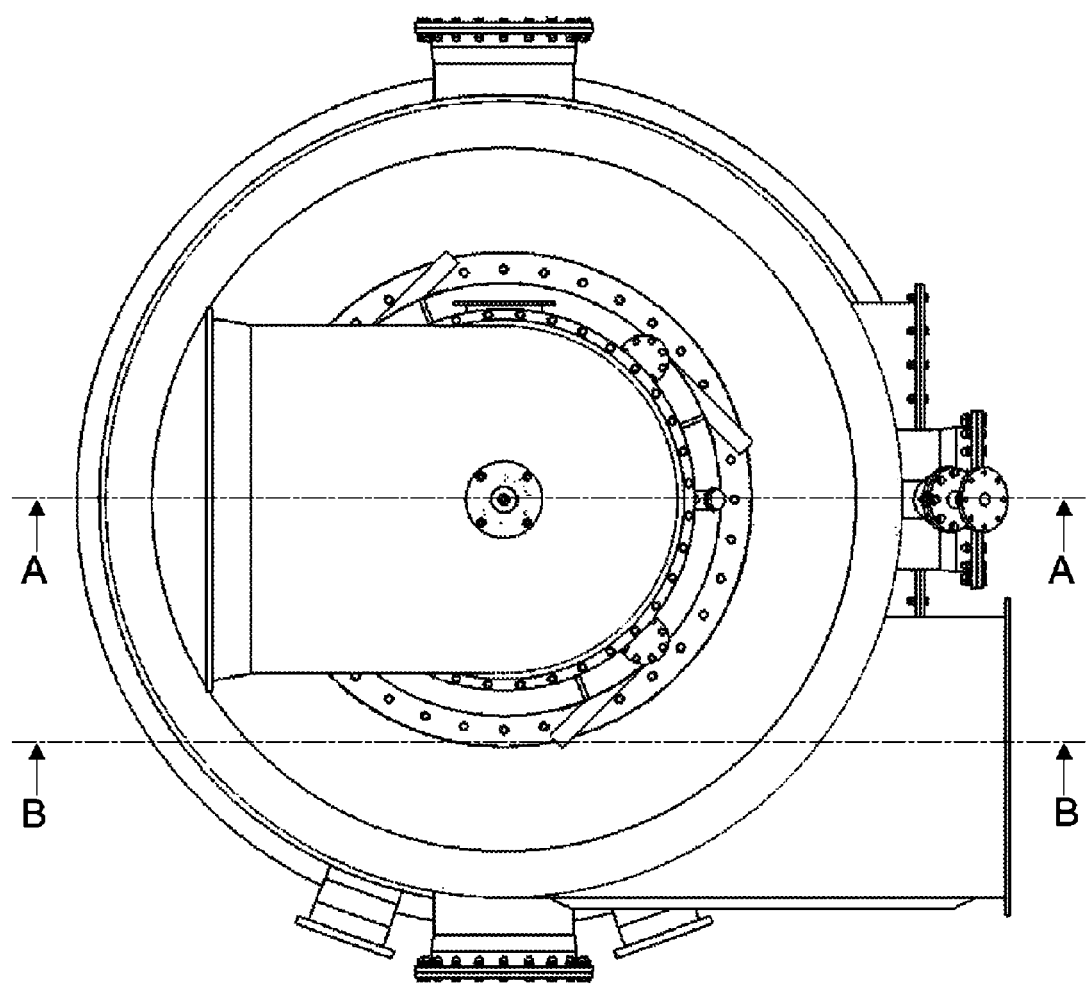
Figure 3:
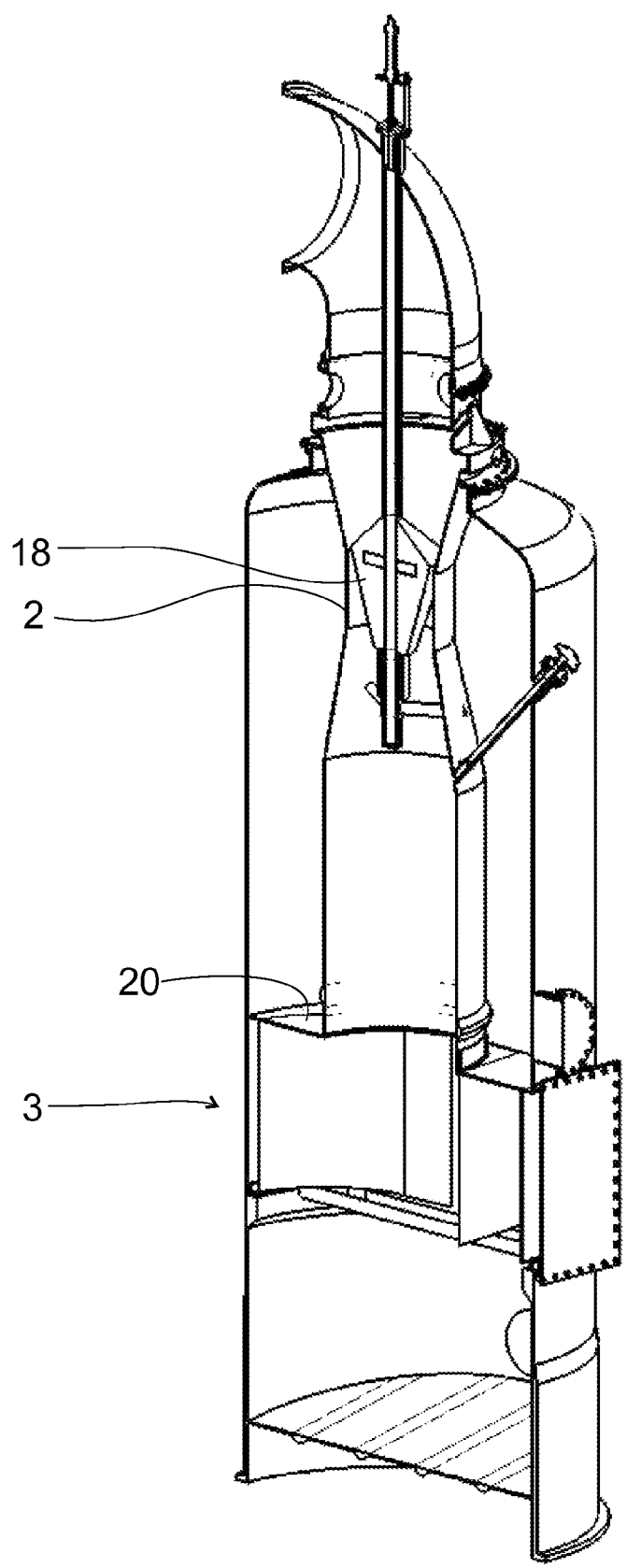
Figure 4:
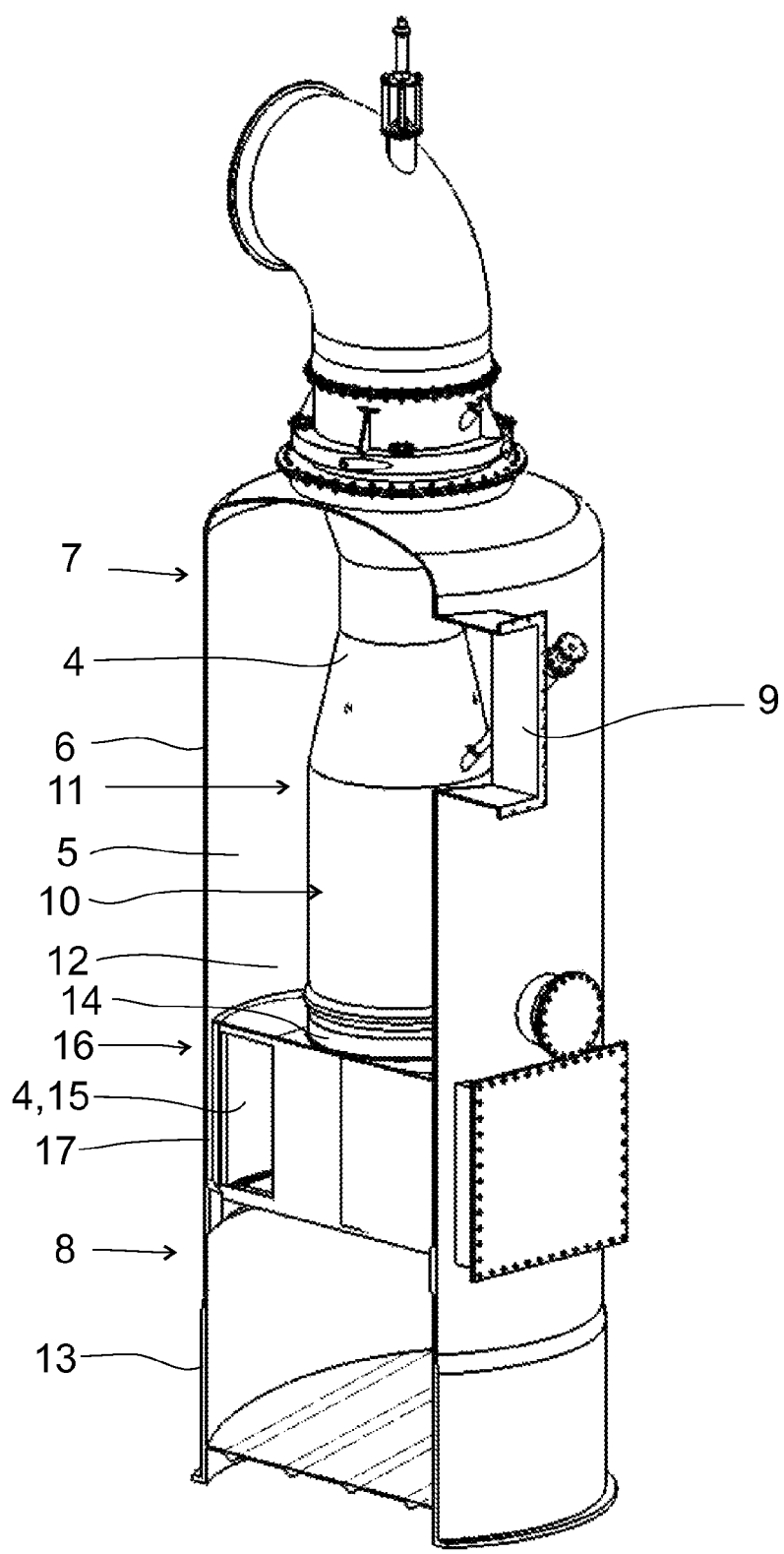
Figure 5:
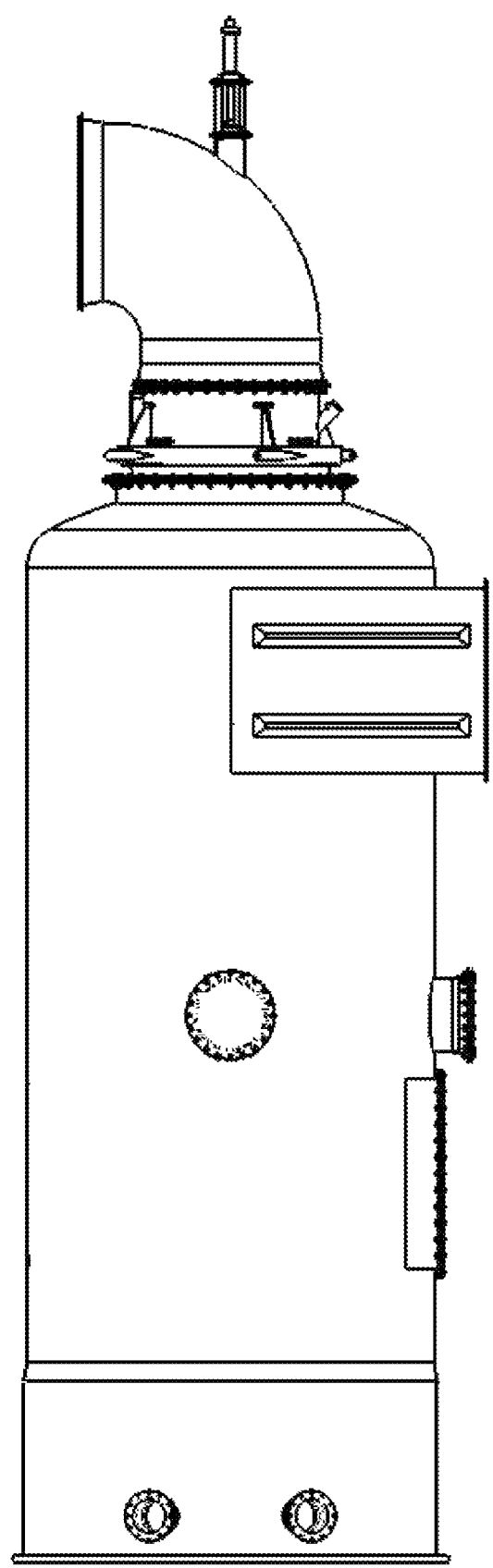
Figure 6:
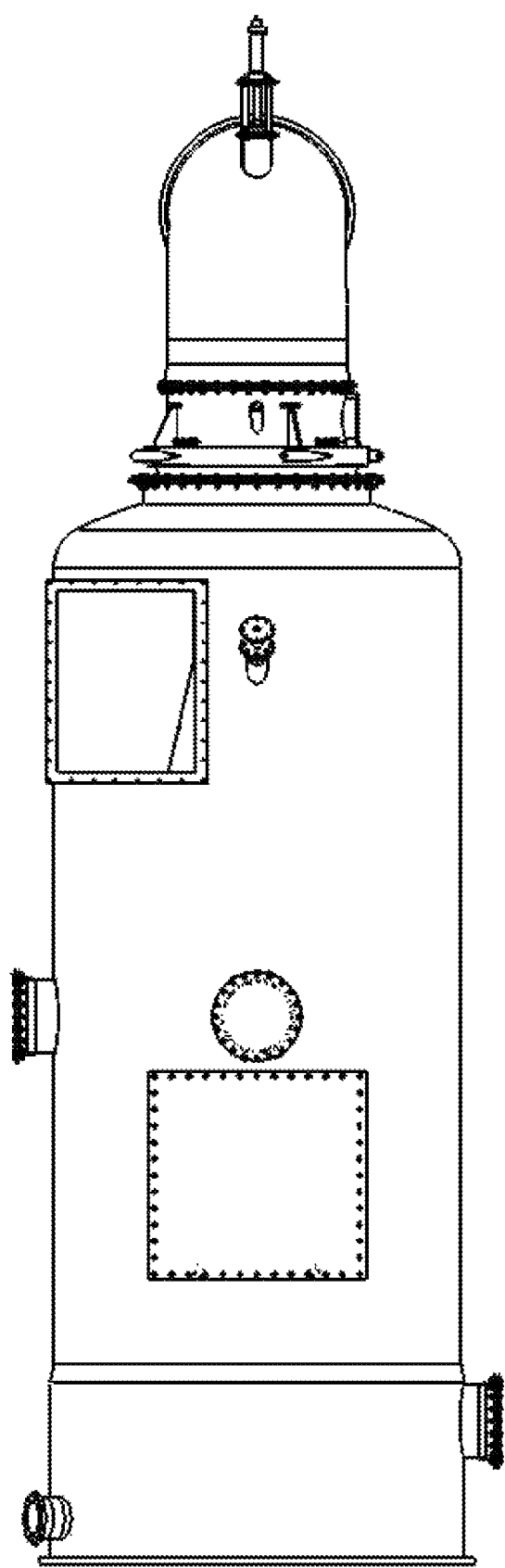
Figure 7:
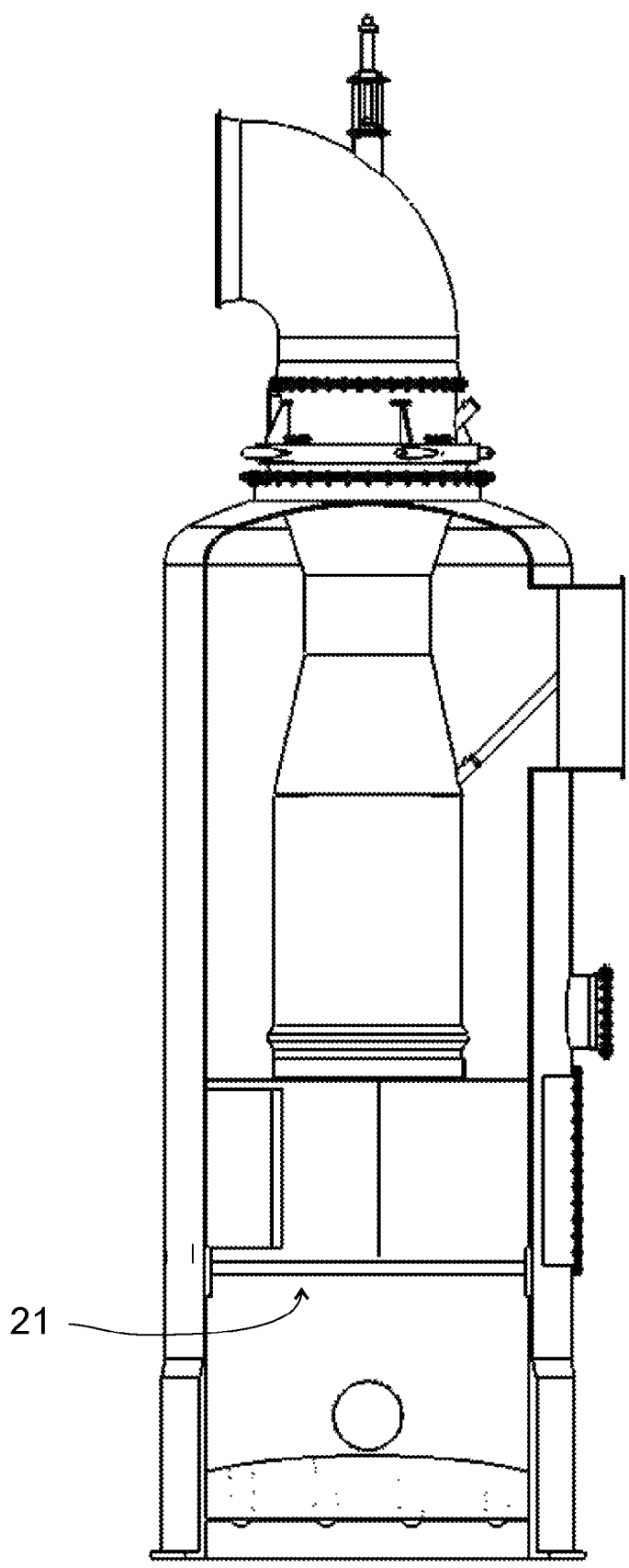
Figure 8:
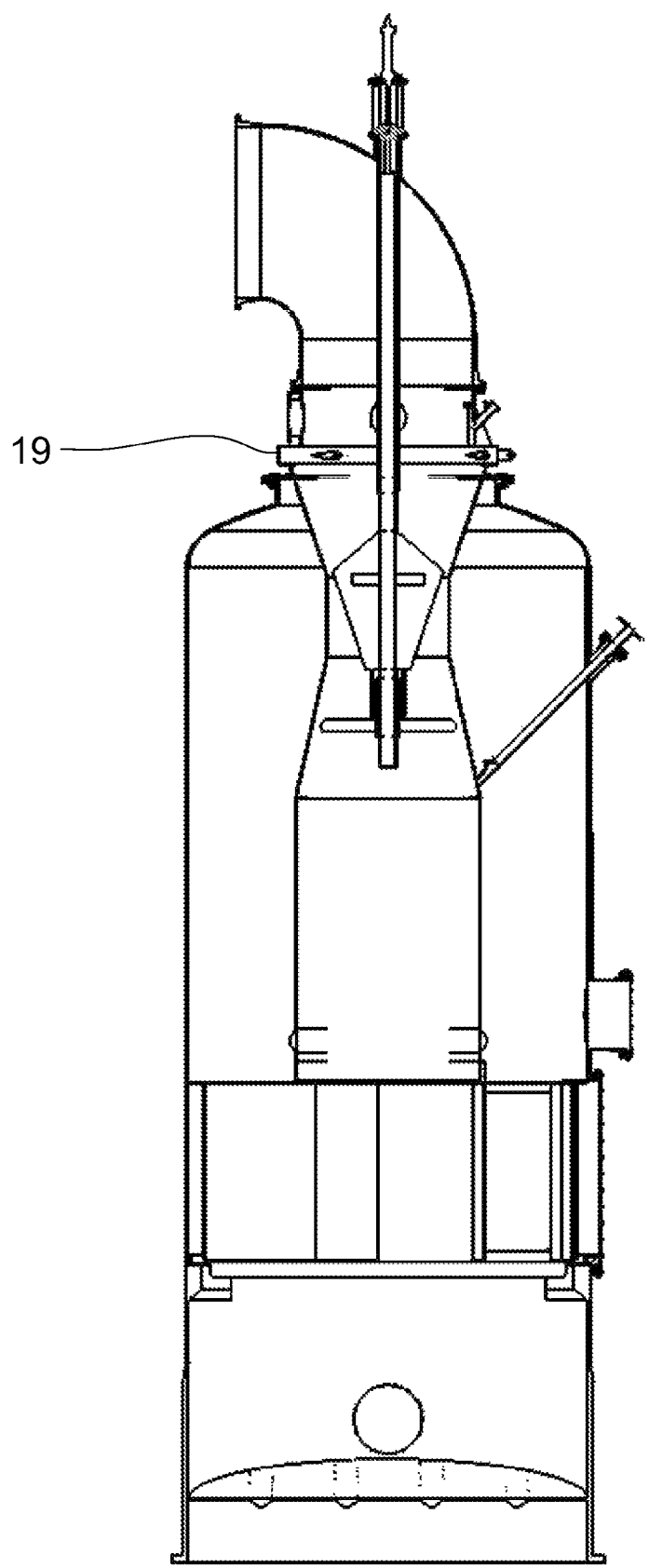
Figure 9:
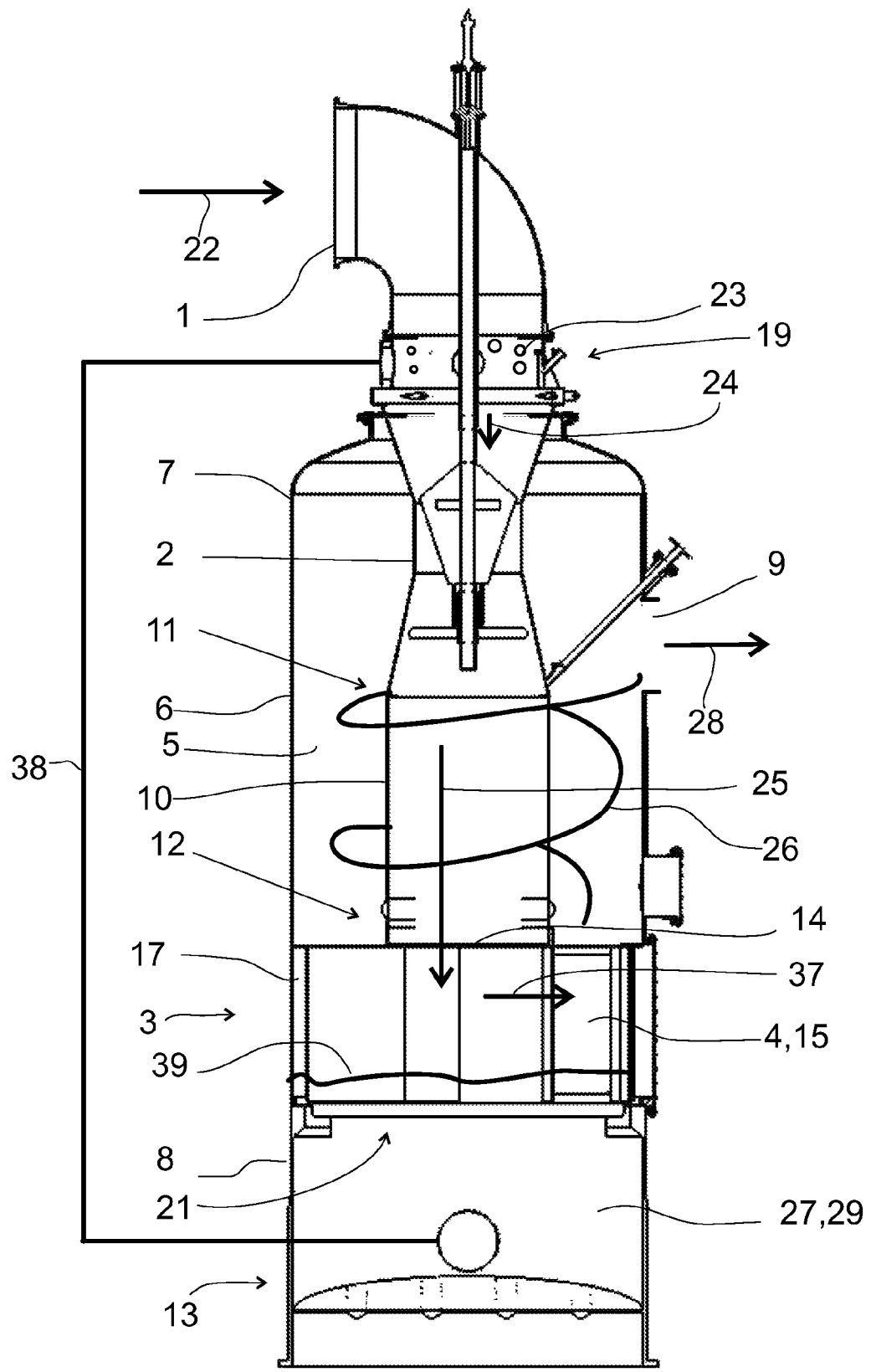
Figure 10:
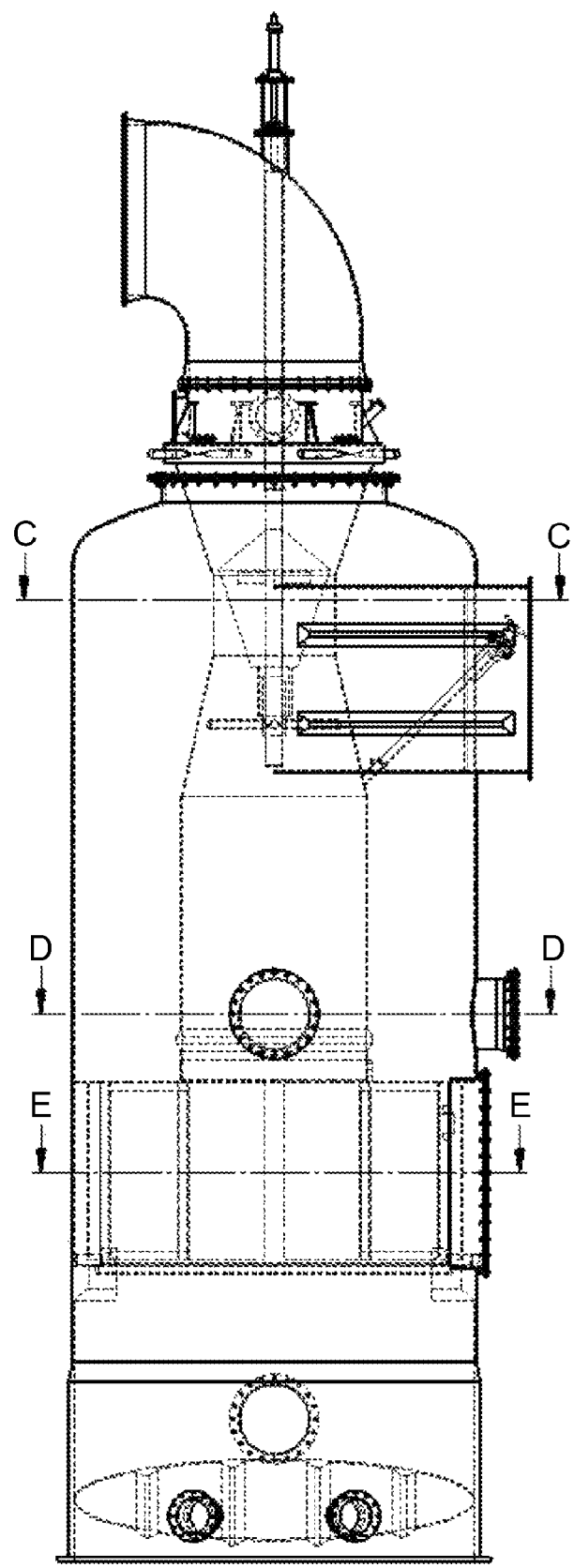
Figure 11:
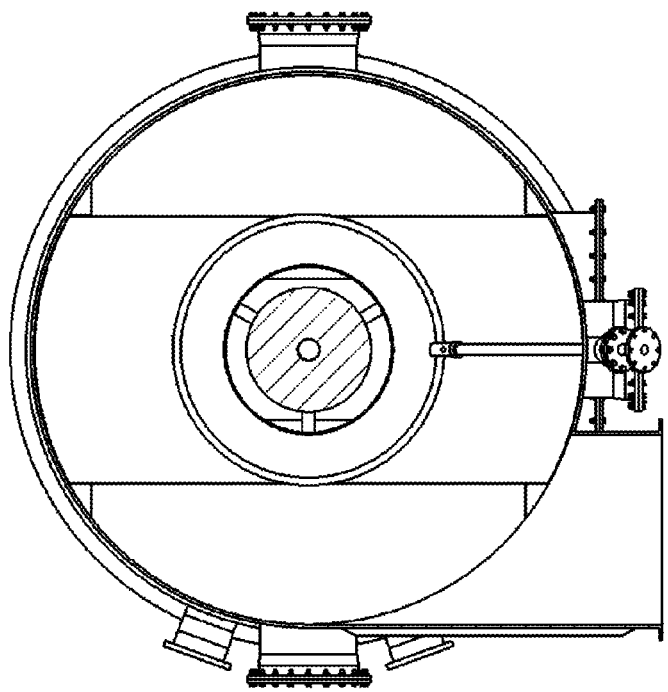
Figure 12:
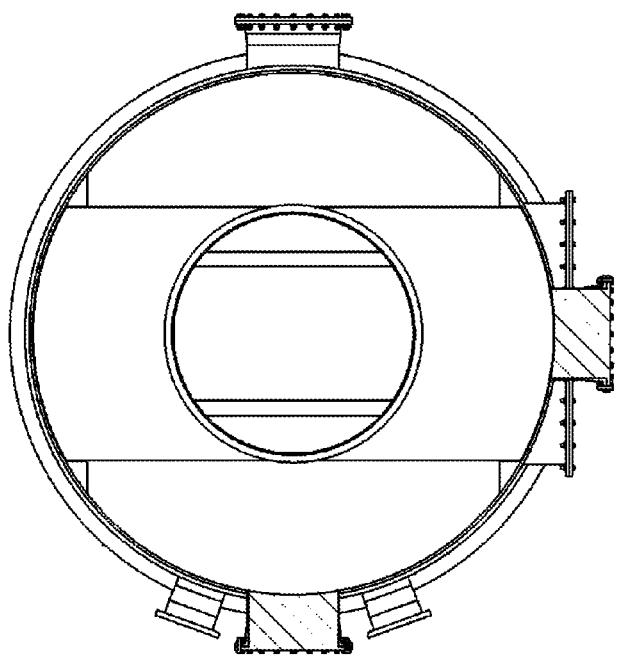
Figure 13:
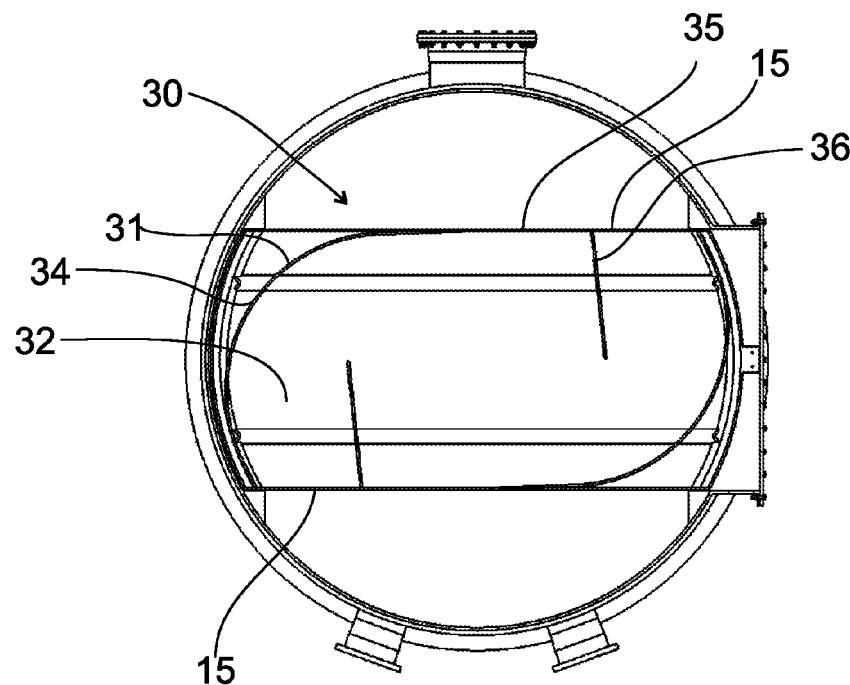
Figure 14:
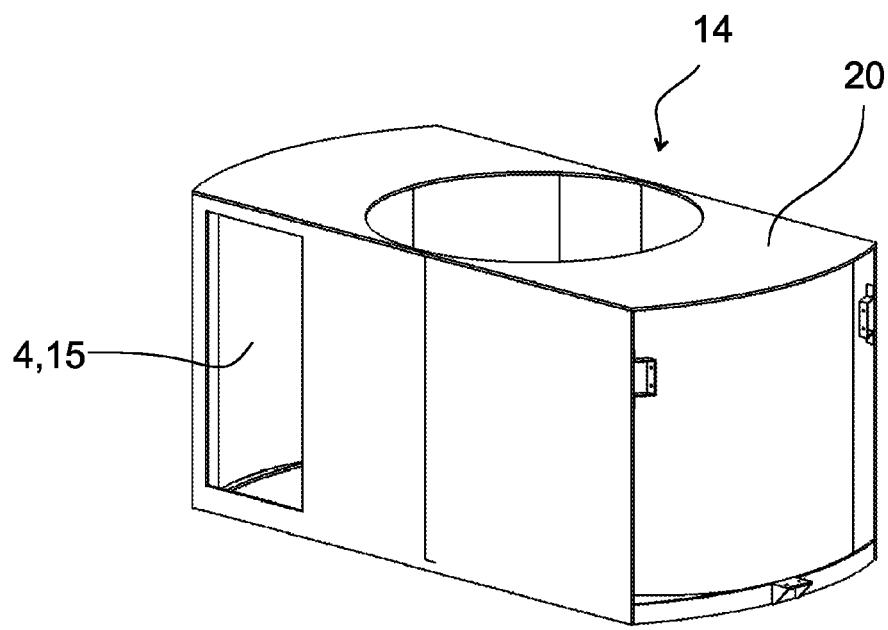
Figure 15:
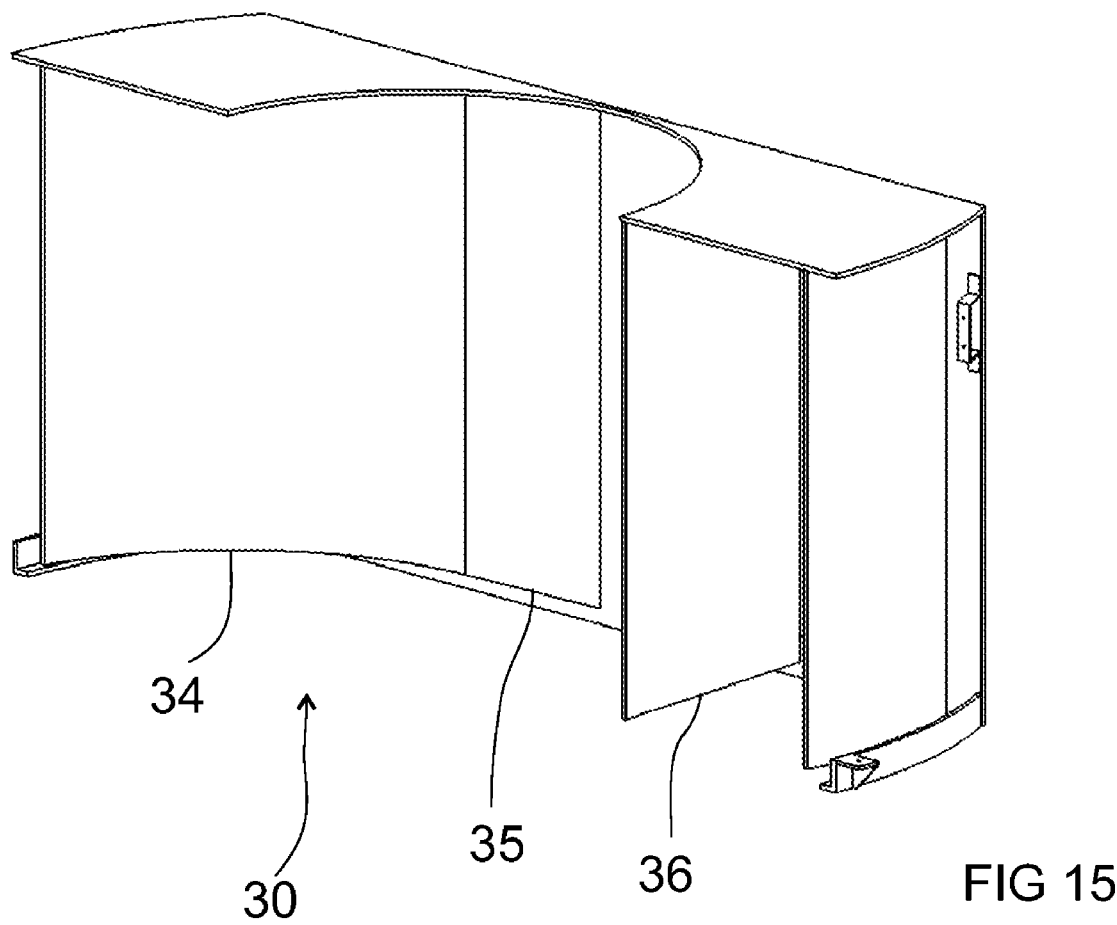
Figure 16:
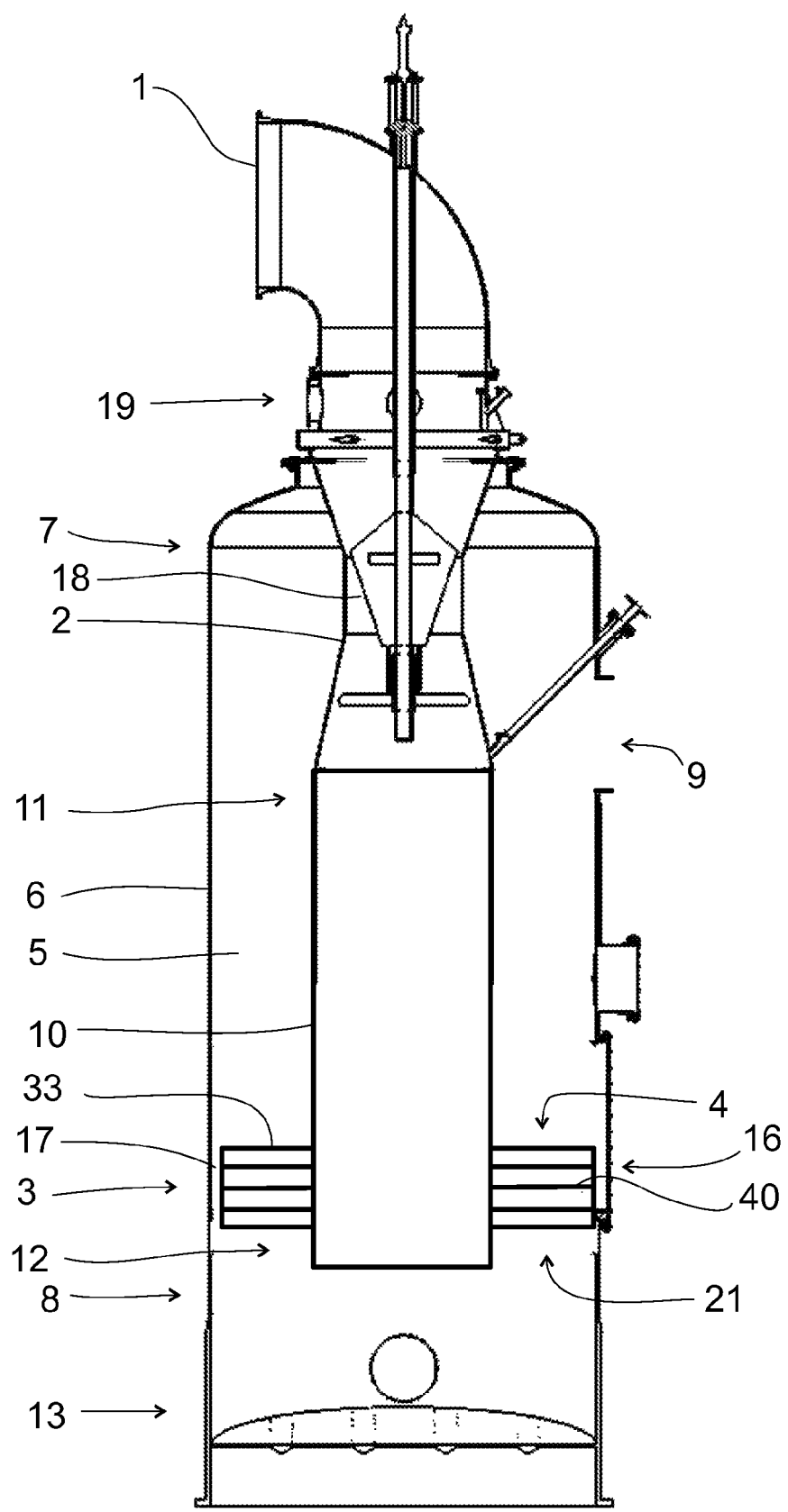
Figure 17:
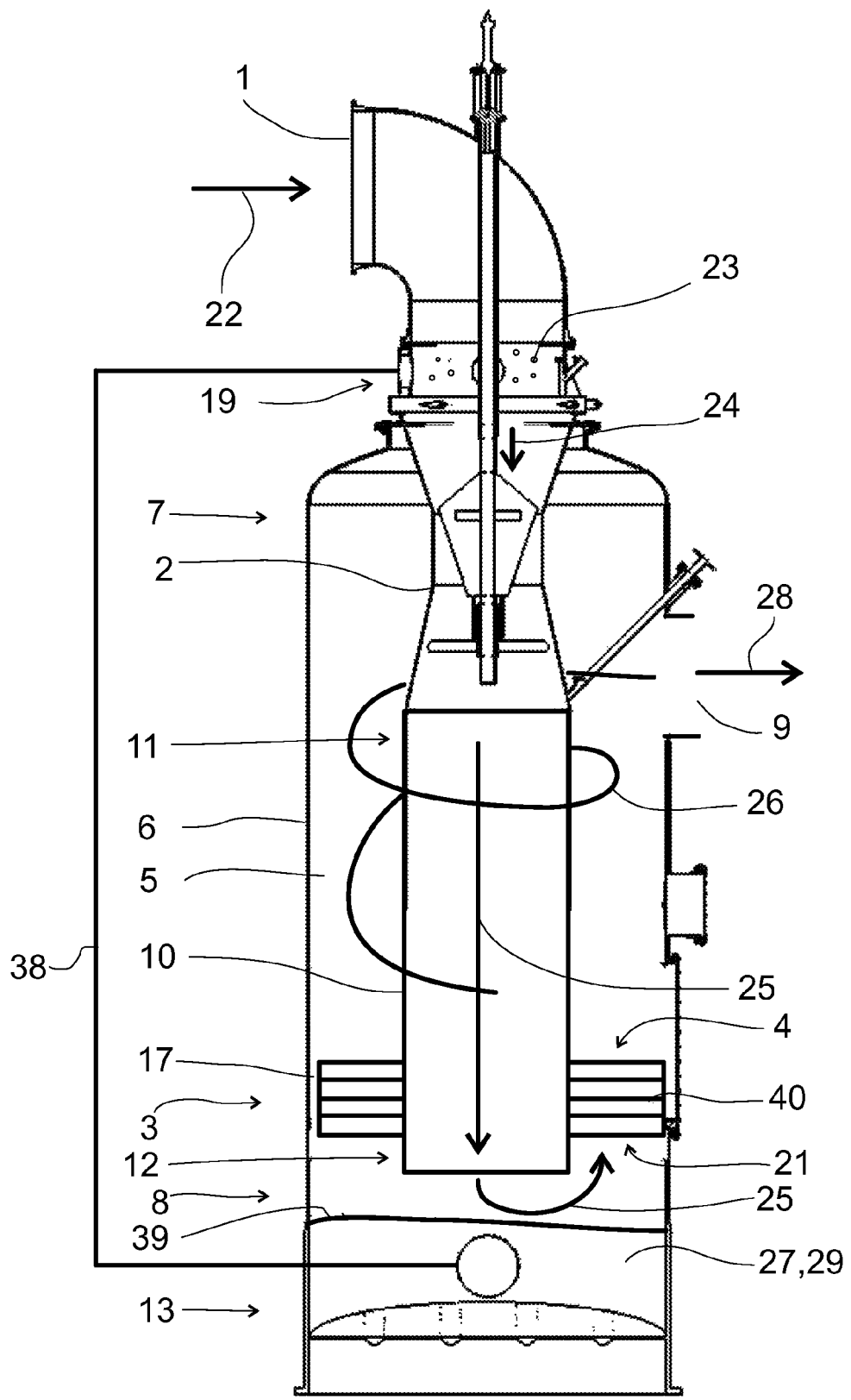

In the following the invention will described in more detail by referring to the figures, which FIG. 1 shows a wet scrubber according to a first embodiment, FIG. 2 shows the wet scrubber shown in FIG. 1 as seen from above, FIG. 3 shows the wet scrubber shown in FIG. 1 as cut along line A-A in FIG. 2, FIG. 4 shows the wet scrubber shown in FIG. 1 as cut along line B-B in FIG. 2, FIG. 5 shows the wet scrubber shown in FIG. 1 as seen from one side, FIG. 6 shows the wet scrubber shown in FIG. 1 as seen from another side, FIG. 7 shows the wet scrubber shown in FIG. 1 as cut along line A-A in FIG. 2, FIG. 8 shows the wet scrubber shown in FIG. 1 as cut along line B-B in FIG. 2, FIG. 9 shows illustrates the function principle of the first embodiment of the wet scrubber illustrated in FIGS. 1 to 8, FIG. 10 shows the wet scrubber shown in FIG. 1 in a partly transparent state, FIG. 11 shows the wet scrubber shown in FIG. 1 as cut along line C-C in FIG. 10, FIG. 12 shows the wet scrubber shown in FIG. 1 as cut along line D-D in FIG. 10, FIG. 13 shows the wet scrubber shown in FIG. 1 as cut along line E-E in FIG. 10, FIG. 14 shows the swirl generator of wet scrubber shown in FIG. 1, FIG. 15 shows the swirl generator shown in FIG. 14 in partly cut state, FIG. 16 shows a west scrubber according to a second embodiment, and FIG. 17 shows illustrates the function principle of the second embodiment of the wet scrubber illustrated in FIG. 16.

DETAILED DESCRIPTION OF THE INVENTION

The invention relates to a method and to a wet scrubber for removing particles from gases. The particles can for example be liquid and/or solid particles of undesired chemicals and/or dust particles.

First the method for removing particles from gases and some embodiments and variants of the method will be described in greater detail.

The method comprises a first gas feeding step for feeding a stream of particles-laden gas 22 into a gas inlet 1 of a wet scrubber.

The method comprises a liquid feeding step for feeding liquid such as liquid droplets 23 or liquid in liquid form into the stream of particles-laden gas 22 to form a stream of liquid- and particles-laden gas 24.

The method comprises an acceleration step for feeding the stream of liquid- and particles-laden gas 24 through a vertically oriented venturi channel 2 of the wet scrubber to raise the velocity of the steam of liquid- and particles-laden gas 24 to form an accelerated stream of liquid- and particles-laden gas 25, wherein the vertically oriented venturi channel 2 having a circular cross-section form.

The method comprises a swirl step for feeding the accelerated stream of liquid- and particles-laden gas 25 into a swirl generator 3 of the wet scrubber for converting the accelerated stream of liquid- and particles-laden gas 25 into cyclonic streams of liquid- and particles-laden gas 26.

The method comprises a second gas feeding step for feeding cyclonic streams of liquid- and particles-laden gas 26 through a gas opening 4 from the swirl generator 3 into a vertical cylindrical separation space 5 of a first vertical cylindrical vessel 6 of the wet scrubber for separating liquid and solids from the cyclonic stream of liquid- and particles-laden gas 26 in the cylindrical separation space 5 of the first vertical cylindrical vessel 6 of the wet scrubber by means of the cyclonic motion of the cyclonic stream of liquid- and particles-laden gas 26 and for forming a stream of scrubbed gas 28, wherein the first vertical cylindrical vessel 6 having a first upper end 7 and a first lower end 8.

The method comprises a gas discharging step for discharging the stream of scrubbed gas 28 from the vertical cylindrical separation space 5 of the first vertical cylindrical vessel 6 of the wet scrubber through a gas outlet 9 in fluid connection with the vertical cylindrical separation space 5 of the first vertical cylindrical vessel 6, wherein the gas outlet 9 is arranged at a level above the gas opening 4.

The method comprises a collecting step for receiving solid particles 29 and liquid 27 from the vertical cylindrical separation space 5 of the first vertical cylindrical vessel 6 in a liquid tank 13 of the wet scrubber, wherein the liquid tank 13 is in fluid connection with the first lower end 8 of the vertical cylindrical separation space 5 of the first vertical cylindrical vessel 6.

The method comprises a providing step for providing a second vertical cylindrical vessel 10 having a second upper end 11 and a second lower end 12.

The method comprises a first arranging step for arranging the second upper end 11 of the second vertical cylindrical vessel 10 in fluid connection with the vertically oriented venturi channel 2 for receiving the accelerated stream of liquid- and particles-laden gas 25 from the vertically oriented venturi channel 2 into the second vertical cylindrical vessel 10.

The method comprises a second arranging step for arranging the second vertical cylindrical vessel 10 and the swirl generator 3 at least partly in the cylindrical separation space 5 of the first vertical cylindrical vessel 6 so that the first vertical cylindrical vessel 6 at least partly coaxially surrounds the second vertical cylindrical vessel 10 and the swirl generator 3. In the second arranging step the vertically oriented venture channel 2 can additionally be arranged at least partly in the cylindrical separation space 5 of the first vertical cylindrical vessel 6 so that the first vertical cylindrical vessel 6 at least partly coaxially surrounds the vertically oriented venture channel 2.

The method may comprise using in the swirl step a swirl generator 3 having an at least partly open bottom 21 in fluid connection with the liquid tank 13 for discharging solid particles and liquid separated in the swirl step in the swirl generator 3 from the swirl generator 3 into the liquid tank 13. Alternatively, the method may comprise using in the swirl step a swirl generator 3 having a closed bottom.

The method comprises preferably, but not necessarily, providing in the vertically oriented venturi channel 2 a vertically movable venturi cone 18 that is axially movable in relation to the vertically oriented venturi channel 2 for adjusting the flow through the vertically oriented venturi channel 2, and adjusting the adjusting the flow through the vertically oriented venturi channel 2 by axially moving the vertically movable venturi cone 18 in relation to the vertically oriented venturi channel 2.

The method comprises preferably, but not necessarily, discharging the stream of scrubbed gas 28 in the gas discharging step from the vertical cylindrical separation space 5 of the first vertical cylindrical vessel 6 through a gas outlet 9 that is formed in the first vertical cylindrical vessel 6.

FIGS. 1 to 15 shows a wet scrubber and parts of a wet scrubber for performing a first embodiment of the method.

The swirl generator 3 used in the swirl step, may as in the first embodiment shown in FIGS. 1 to 15, have an upper axial inlet 14 for receiving the stream of accelerated stream of liquid- and particles-laden gas 25, and a blade arrangement 30 forming transversal flow channels 32 for converting the stream of accelerated stream of liquid- and particles-laden gas 25 into tangential streams of liquid- and particles-laden gas. The blade arrangement 30 is symmetrical with respect to the vertical cylindrical separation space 5 of the first vertical cylindrical vessel 6 and each transversal flow channel 32 leads from the upper axial inlet 14 and terminates in a gas opening 4 or gas openings 4 in the form of a radial outlet 15.

This first embodiment of the method includes connecting the upper axial inlet 14 of the swirl generator 3 in fluid connection the second lower end 12 of the second vertical cylindrical vessel 10 for receiving the stream of accelerated stream of liquid- and particles-laden gas 25 from the second vertical cylindrical vessel 10.

This first embodiment of the method includes arranging the radial outlets 15 of the swirl generator 3 to open up into the vertical cylindrical separation space 5 of the first vertical cylindrical vessel 6.

The swirl step of this first embodiment of the method includes feeding the stream of accelerated stream of liquid- and particles-laden gas 25 from the second vertical cylindrical vessel 10 through the upper axial inlet 14 of the swirl generator 3 into the swirl generator 3.

The swirl step of this first embodiment of the method includes converting the stream of accelerated stream of liquid- and particles-laden gas 25 in the flow channels 32 into tangential streams of liquid- and particles-laden gas 37.

The swirl step of this first embodiment of the method includes discharging tangential streams of liquid- and particles-laden gas 37 from the radial outlets 15 of the swirl generator 3 into the vertical cylindrical separation space 5 of the first vertical cylindrical vessel 6 to form said cyclonic streams liquid- and particles-laden gas 26 in the vertical cylindrical separation space 5 of the first vertical cylindrical vessel 6.

The swirl generator 3 used in the swirl step in the first embodiment of the method may have a top that except for the upper axial inlet 14 being closed by means least one top cover 20.

The swirl generator 3 used in the swirl step in the first embodiment of the method may have an at least partly open bottom 21 in fluid connection with the liquid tank 13 for discharging solid particles 29 and liquid 27 separated in the swirl generator 3 from the swirl generator 3 into the liquid tank 13. If the swirl generator 3 used in the swirl step have an at least partly open bottom 21, the method includes discharging solid particles 29 and liquid 27 from the swirl generator 3 from the swirl generator 3 into the liquid tank 13 during the swirl step.

The swirl generator 3 used in the swirl step in the first embodiment of the method may have a blade arrangement 30 comprising two blades 31 each having a curved section 34, a first plane section 35 having a side that is connected to the curved section 34, and a second plane section 36 having a side that is connected at an angle to the first plane section 35 so that flow channels 32 are formed between said two blades 31, each flow channel 32 leading from the axial inlet 14 of the swirl generator 3 to a radial outlet 15 of the swirl generator 3.

The method according to the first embodiment comprises preferably, but not necessarily, arranging the swirl generator 3 in the vertical cylindrical separation space 5 of the first vertical cylindrical vessel 6 so that a circumferential space 17 is formed between the swirl generator 3 and the inner wall of the vertical cylindrical separation space 5 of the first vertical cylindrical vessel 6 for improving the gas flow around the swirl generator 3 resulting in a better cyclonic action of the gas.

The gas flow through the wet scrubber is for example created by means of an external flow generator (not shown in the drawings) in fluid connection with the wet scrubber.

FIGS. 16 and 17 shows a scrubber for performing a second embodiment of the method.

This second embodiment of the method comprises forming an annular space 16 between the first vertical cylindrical vessel 6 and the second vertical cylindrical vessel 10. The swirl generator 3 used in the swirl step of the method of this second embodiment has a ring-shaped configuration and comprises a plurality of guide vanes 40 for forming said cyclonic streams of liquid- and solid laden gas 26 of the stream of said accelerated stream of liquid- and solid laden gas 25. This second embodiment of the method comprises forming said gas opening 4 for feeding cyclonic streams of liquid- and particles-laden gas 25 from the swirl generator 3 into the vertical cylindrical separation space 5 of the first vertical vessel of an open upper surface 33 of the swirl generator 3.

This second embodiment of the method comprises arranging the swirl generator 3 in the annular space 16 between the first vertical cylindrical vessel 6 and the second vertical cylindrical vessel 10 for receiving the accelerated stream of liquid- and solid laden gas from the second vertical cylindrical vessel 10.

This second embodiment of the method comprises preferably, but not necessarily, arranging the swirl generator 3 in the annular space 16 between the first vertical cylindrical vessel 6 and the second vertical cylindrical vessel 10 so that a circumferential space 17 is formed between the swirl generator 3 and the inner wall of the vertical cylindrical separation space 5 of the first vertical cylindrical vessel 6 for allowing solid particles and liquid to flow past the swirl generator 3 from a location above the swirl generator 3 to the liquid tank 13 below the swirl generator 3.

This second embodiment of the method comprises preferably, but not necessarily, arranging the second vertical cylindrical vessel 10 in the vertical cylindrical separation space 5 of the first vertical cylindrical vessel 6 so that the second lower end 12 of the second vertical cylindrical vessel 10 opening up into the vertical cylindrical separation space 5 of the first vertical cylindrical vessel 6 at a level below the swirl generator 3 and at level above the liquid tank 13.

This second embodiment of the method comprises preferably, but not necessarily, providing in the providing step a second vertical cylindrical vessel 10 having a second lower end 12 in the form of a circular opening, and arranging the second vertical cylindrical vessel 10 in the second arranging step so that the second lower end 12 of the second vertical cylindrical vessel 10 faces the liquid tank 13.

The method may include a circulation step for circulating liquid from the liquid tank 13 of the wet scrubber to liquid feeding means 19 to be used in the liquid feeding means.

The method may include selecting amount of liquid in the liquid tank 13 so that the swirl generator 3 is partly submerged in liquid in the vertical cylindrical separation space 5 of the first vertical cylindrical vessel 6. It is for example possible that the swirl generator 3 is by some centimeters submerged into liquid. In such case, the method may include adjusting the amount of liquid in the liquid tank 13 so that the position of the liquid level 39 shifts to adjust the velocity of the stream of scrubbed gas 28 that is discharged in the gas discharged step. In such case the method may comprise measuring the velocity of the stream of scrubbed gas 28 that is discharged in the gas discharged step and automatically adjusting the amount of liquid in the liquid tank 13 for example to maintain an essentially constant velocity.

Next the wet scrubber for removing particles such as particles from gases and some embodiments and variants of the wet scrubber will be described in greater detail.

The wet scrubber comprises a gas inlet 1 for receiving a stream of particles-laden gas 22. The particles can be liquid particles and/or solid particles.

The wet scrubber comprises liquid feeding means 19 for feeding liquid such as liquid droplets 23 or liquid in liquid form into the stream of particles-laden gas to form a stream of liquid- and particles-laden gas 24, The wet scrubber comprises a vertically oriented venturi channel 2 for raising the velocity of the steam of liquid- and particles-laden gas 24 to form a stream of accelerated stream of liquid- and particles-laden gas 25. The vertically oriented venturi channel 2 has a circular cross-section form.

The wet scrubber comprises a swirl generator 3 for forming cyclonic streams of liquid- and particles-laden gas 26 of the stream of accelerated stream of liquid- and particles-laden gas 25.

The wet scrubber comprises a gas opening 4 for feeding the cyclonic streams of liquid- and particles-laden gas 26 from the swirl generator 3.

The wet scrubber comprises a first vertical cylindrical vessel 6 for receiving the cyclonic streams of liquid- and particles-laden gas 26 from the swirl generator 3 for in the cylindrical separation space 5 of a first vertical cylindrical vessel 6 separate liquid and particles from the cyclonic streams of liquid and particles-laden gas by means of the cyclonic motion of the cyclonic stream of liquid- and particles-laden gas 26 and for forming a stream of scrubbed gas 28, wherein the first vertical cylindrical vessel 6 having an first upper end 7 and a first lower end 8.

The wet scrubber comprises a gas outlet 9 for removing the stream of scrubbed gas 28 from the cylindrical separation space 5 of the first vertical cylindrical vessel 6. The gas outlet 9 is arranged at a level above the gas opening 4.

The wet scrubber comprises a liquid tank 13 in fluid connection with the first lower end 8 of the first vertical cylindrical vessel 6 for receiving solid particles and liquid from in the cylindrical separation space 5 of the first vertical cylindrical vessel 6.

The wet scrubber comprises a second vertical cylindrical vessel 10 has an second upper end 11 for receiving the accelerated stream of liquid- and particles-laden gas 25 from the vertically oriented venturi channel 2 and a second lower end 12 for feeding the accelerated stream of liquid- and particles-laden gas 25 from the second vertical cylindrical vessel 10 to the swirl generator 3.

The second vertical cylindrical vessel 10 and the swirl generator 3 are at least partly arranged in the vertical cylindrical separation space 5 of the first vertical cylindrical vessel 6 so that the first vertical cylindrical vessel 6 coaxially surrounds second vertical cylindrical vessel 10 and the swirl generator 3. The vertically oriented venture channel 2 can additionally be arranged at least partly in the cylindrical separation space 5 of the first vertical cylindrical vessel 6 so that the first vertical cylindrical vessel 6 at least partly coaxially surrounds the vertically oriented venture channel 2.

The swirl generator 3 may be at least partly open towards the liquid tank 13 for discharging solid particles and liquid separated in the swirl generator 3 into the liquid tank 13.

A venturi cone 18 is preferably, but not necessarily, arranged in the vertically oriented venturi channel 2 so that the venturi cone 18 is axially movable to adjust the flow through the vertically oriented venturi channel 2.

The gas outlet 9 is preferably, but not necessarily, formed tangentially in the first vertical cylindrical vessel 6

FIGS. 1 to 10 show a first embodiment of the wet scrubber.

In the first embodiment of the scrubber, the top of the swirl generator 3 has an upper axial inlet 14 connected with and in fluid connection with the second lower end 12 of the second vertical cylindrical vessel 10 for receiving the stream of accelerated stream of liquid- and particles-laden gas 25 from the second vertical cylindrical vessel 10.

In this first embodiment of the scrubber, the swirl generator 3 has a blade arrangement 30 for converting the stream of accelerated stream of liquid- and particles-laden gas 25 into tangential streams of liquid- and particles-laden gas 37.

In this first embodiment of the scrubber, the blade arrangement 30 of the swirl generator 3 is symmetrical with respect to the vertical cylindrical separation space 5 of the first vertical cylindrical vessel 6.

In this first embodiment of the scrubber, the blade arrangement 30 of the swirl generator 3 terminates in gas openings 4 in the form of radial outlets 15 opening up into the vertical cylindrical separation space 5 of the first vertical cylindrical vessel 6 for discharging tangential streams of liquid- and particles-laden gas into the vertical cylindrical separation space 5 of the first vertical cylindrical vessel 6 to form said cyclonic streams liquid- and particles-laden gas in the vertical cylindrical separation space 5 of the first vertical cylindrical vessel 6.

In this first embodiment of the scrubber, the top of the swirl generator 3 except for the upper axial inlet 14 is preferably, but not necessarily, closed by means least one top cover 20.

In this first embodiment of the scrubber, the swirl generator 3 has preferably, but not necessarily, an at least partly open bottom 21 in fluid connection with the liquid tank 13 for discharging solid particles and liquid separated in the swirl generator 3 from the swirl generator 3 into the liquid tank 13.

In this first embodiment of the scrubber, the blade arrangement 30 of the swirl generator 3 comprises preferably, but not necessarily, two blades 31 each having a curved section 34, a first plane section 35 having a side that is connected to the curved section 34, and a second plane section 36 having a side that is connected at an angle to the first plane section 35, and two flow channels 32 are formed between said two blades, each of said two flow channels 32 leading from the axial inlet of the swirl generator 3 to a radial outlet 15 of the swirl generator 3. This first embodiment of the scrubber, comprises preferably, but not necessarily, a circumferential space 17 between the swirl generator 3 and the inner wall of the vertical cylindrical separation space 5 of the first vertical cylindrical vessel 6 for improving the gas flow around the swirl generator 3 resulting in a better cyclonic action of the gas.

FIGS. 16 and 17 show a second embodiment of the wet scrubber

This second embodiment of the scrubber, comprises an annular space 16 between the first vertical cylindrical vessel 6 and the second vertical cylindrical vessel 10. In this second embodiment of the scrubber, the swirl generator 3 is arranged in the annular space 16 between the first vertical cylindrical vessel 6 and the second vertical cylindrical vessel 10 for receiving the accelerated stream of liquid- and solid laden gas from the second vertical cylindrical vessel 10. In this second embodiment of the scrubber, the swirl generator 3 has a ring-shaped configuration and comprises a plurality of guide vanes 40 for forming said cyclonic streams of liquid- and solid laden gas of the stream of said accelerated stream of liquid- and solid laden gas.

This second embodiment of the scrubber, comprises preferably, but not necessarily, a circumferential space 17 between the swirl generator 3 and the inner wall of the vertical cylindrical separation space 5 of the first vertical cylindrical vessel 6 for allowing solid particles and liquid to flow past the swirl generator 3 from a location above the swirl generator 3 to the liquid tank 13 below the swirl generator 3.

In this second embodiment of the scrubber, the second lower end 12 of the second vertical cylindrical vessel 10 opens preferably, but not necessarily, up into the vertical cylindrical separation space 5 of the first vertical cylindrical vessel 6 at a level below the swirl generator 3 and at level above the liquid tank 13.

In this second embodiment of the scrubber, the second lower end 12 of the second vertical cylindrical vessel 10 being preferably, but not necessarily, in the form of a circular opening facing the liquid tank 13

The wet scrubber may include a circulation means 38 for circulating liquid from the liquid tank 13 of the wet scrubber to liquid feeding means 19 to be used in the liquid feeding means 19.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for removing particles from gas, wherein said method comprises:
   a first gas feeding step for feeding a stream of particles-laden gas into a gas inlet of a wet scrubber,
   a liquid feeding step for feeding liquid into the stream of particles-laden gas to form a stream of liquid- and particles-laden gas,
   an acceleration step for feeding the steam of liquid- and particles-laden gas through a vertically oriented venturi channel of the wet scrubber to raise the velocity of the stream of liquid- and particles-laden gas to form an accelerated stream of liquid- and particles-laden gas, wherein the vertically oriented venturi channel having a circular cross-section form,
   a swirl step for feeding the accelerated stream of liquid- and particles-laden gas into a swirl generator of the wet scrubber for converting the accelerated stream of liquid- and particles-laden gas into a cyclonic stream of liquid- and particles-laden gas,
   a second gas feeding step for feeding the cyclonic stream of liquid- and particles-laden gas from the swirl generator through a gas opening into a vertical cylindrical separation space of a first vertical cylindrical vessel of the wet scrubber for separating liquid and solids from the cyclonic stream of liquid- and particles-laden gas in the cylindrical separation space of the first vertical cylindrical vessel of the wet scrubber by means of the cyclonic motion of the cyclonic stream of liquid- and particles-laden gas and for forming a stream of scrubbed gas, wherein the first vertical cylindrical vessel having an first upper end and a first lower end, a gas discharging step for removing the stream of scrubbed gas from the vertical cylindrical separation space of the first vertical cylindrical vessel of the wet scrubber through a gas outlet in fluid connection with the vertical cylindrical separation space of the first vertical cylindrical vessel, wherein the gas outlet is arranged at a level above the gas opening, and a collecting step for receiving particles and liquid from the vertical cylindrical separation space of the first vertical cylindrical vessel in a liquid tank of the wet scrubber, wherein the liquid tank is in fluid connection with the first lower end of the vertical cylindrical separation space of the first vertical cylindrical vessel, said method further comprising a providing step for providing a second vertical cylindrical vessel having a second upper end and a second lower end, by a first arranging step for arranging the second upper end of the second vertical cylindrical vessel in fluid connection with the vertically oriented venturi channel for receiving the accelerated stream of liquid- and particles-laden gas from the vertically oriented venturi channel in the second vertical cylindrical vessel, by a second arranging step for arranging, the second vertical cylindrical vessel and the swirl generator at least partly in the cylindrical separation space of the first vertical cylindrical vessel so that the first vertical cylindrical vessel coaxially at least partly surrounds the second vertical cylindrical vessel and the swirl generator, and by arranging the swirl generator above the liquid tank.

2. The method according to claim 1, wherein
the swirl generator used in the swirl step has an upper axial inlet for receiving the stream of accelerated stream of liquid- and particles-laden gas, and a blade arrangement forming flow channels for converting the stream of accelerated stream of liquid- and particles-laden gas into tangential streams of liquid- and particles-laden gas, wherein the blade arrangement is symmetrical with respect to the vertical cylindrical separation space of the first vertical cylindrical vessel and wherein each flow channel leading from the upper axial inlet and terminating in a gas opening is in the form of a radial outlet for discharging a tangential stream of liquid- and particles-laden gas from the flow channel, connecting the upper axial inlet of the swirl generator in fluid connection with the second lower end of the second vertical cylindrical vessel for receiving the stream of accelerated stream of liquid- and particles-laden gas from the second vertical cylindrical vessel, arranging the radial outlets of the swirl generator to open up into the vertical cylindrical separation space of the first vertical cylindrical vessel, feeding the stream of accelerated stream of liquid- and particles-laden gas from the second vertical cylindrical vessel through the upper axial inlet of the swirl generator into the swirl generator, converting the stream of accelerated stream of liquid- and particles-laden gas in the flow channels into tangential streams of liquid- and particles-laden gas, and discharging tangential streams of liquid- and particles-laden gas from the radial outlets of the swirl generator into the vertical cylindrical separation space of the first vertical cylindrical vessel to form said cyclonic streams liquid- and particles-laden gas in the vertical cylindrical separation space of the first vertical cylindrical vessel.

3. The method according to claim 2, wherein
the swirl generator used in the swirl step has a top that except for the upper axial inlet is closed by means of at least one top cover.

4. The method according to claim 2, wherein
the swirl generator used in the swirl step has an at least partly open bottom in fluid connection with the liquid tank for discharging solid particles and liquid separated in the swirl generator from the swirl generator into the liquid tank, and discharging solid particles and liquid from the swirl generator into the liquid tank during the swirl step.

5. The method according to claim 2, wherein
the swirl generator used in the swirl step has the blade arrangement comprising two blades each having a curved section, a first plane section having a side that is connected to the curved section, and a second plane section having a side that is connected at an angle to the first plane section, wherein flow channels being formed between said two blades, each flow channel leading from the axial inlet of the swirl generator to a radial outlet of the swirl generator.

6. The method according to claim 2, wherein
arranging the swirl generator in the vertical cylindrical separation space of the first vertical cylindrical vessel so that a circumferential space is formed between the swirl generator and the inner wall of the vertical cylindrical separation space of the first vertical cylindrical vessel.

7. The method according to claim 1, wherein
forming an annular space between the first vertical cylindrical vessel and the second vertical cylindrical vessel, the swirl generator used in the swirl step has a ring-shaped configuration and comprising a plurality of guide vanes for forming said cyclonic streams of liquid- and solid laden gas of the stream of said accelerated stream of liquid- and solid laden gas, and arranging the swirl generator in the annular space between the first vertical cylindrical vessel and the second vertical cylindrical vessel for receiving the accelerated stream of liquid- and solid laden gas from the second vertical cylindrical vessel.

8. The method according to claim 7, wherein
arranging the swirl generator in the annular space between the first vertical cylindrical vessel and the second vertical cylindrical vessel so that a circumferential space is formed between the swirl generator and the inner wall of the vertical cylindrical separation space of the first vertical cylindrical vessel for allowing solid particles and liquid to flow past the swirl generator from a location above the swirl generator to the liquid tank below the swirl generator.

9. The method according to claim 7, wherein
arranging the second vertical cylindrical vessel in the vertical cylindrical separation space of the first vertical cylindrical vessel so that the second lower end of the second vertical cylindrical vessel opening up into the vertical cylindrical separation space of the first vertical cylindrical vessel at a level below the swirl generator and at level above the liquid tank.

10. The method according claim 7, wherein
providing in the providing step a second vertical cylindrical vessel having a second lower end in the form of a circular opening, and
arranging the second vertical cylindrical vessel in the second arranging step so that the second lower end of the second vertical cylindrical vessel faces the liquid tank.

11. The method according to claim 1, wherein
providing in the vertically oriented venturi channel a vertically movable venturi cone that is axially movable for adjusting the flow through the vertically oriented venturi channel, and
adjusting the adjusting the flow through the vertically oriented venturi channel by moving the vertically movable venturi cone.

12. The method according to claim 1, wherein
discharging the stream of scrubbed gas in the gas discharging step from the vertical cylindrical separation space of the first vertical cylindrical vessel through a gas outlet that is formed tangentially in the first vertical cylindrical vessel.

13. The method according to claim 1, wherein
using in the swirl step a swirl generator having an at least partly open bottom in fluid connection with the liquid tank for discharging particles and liquid separated in the swirl step in the swirl generator into the liquid tank.

14. The method according to claim 1, wherein
selecting amount of liquid in the liquid tank so that the swirl generator is partly submerged in liquid in the vertical cylindrical separation space of the first vertical cylindrical vessel.

15. The method according to claim 14, wherein
adjusting the amount of liquid in the liquid tank to adjust the velocity of the stream of scrubbed gas that is discharged in the gas discharged step.

16. A wet scrubber for removing particles from gases, wherein said wet scrubber comprises:
a gas inlet for receiving a stream of particles-laden gas,
liquid feeding means for feeding liquid into the stream of particles-laden gas to form a stream of liquid- and particles-laden gas,
a vertically oriented venturi channel for raising the velocity of the steam of liquid- and particles-laden gas to form a stream of accelerated stream of liquid- and particles-laden gas, wherein the vertically oriented venturi channel having a circular cross-section form,
a swirl generator for forming a cyclonic stream of liquid- and particles-laden gas of the stream of accelerated stream of liquid- and particles-laden gas,
a gas opening for feeding the cyclonic stream of liquid- and particles-laden gas from the swirl generator,
a first vertical cylindrical vessel for receiving the cyclonic stream of liquid- and particles-laden gas from the swirl generator for in a cylindrical separation space of a first vertical cylindrical vessel separating liquid and solids from the stream of liquid- and particles-laden gas by means of the cyclonic motion of the cyclonic stream of liquid- and particles-laden gas and for forming a stream of scrubbed gas, wherein the first vertical cylindrical vessel having an first upper end and a first lower end,
a gas outlet for removing the stream of scrubbed gas from the cylindrical separation space of the first vertical cylindrical vessel, wherein the gas outlet is arranged at a level above the gas opening, and
a liquid tank in fluid connection with the first lower end of the first vertical cylindrical vessel for receiving solid particles and liquid from in the cylindrical separation space of the first vertical cylindrical vessel,
a second vertical cylindrical vessel having a second upper end for receiving the accelerated stream of liquid- and particles-laden gas from the vertically oriented venturi channel and a second lower end for feeding the accelerated stream of liquid- and particles-laden gas from the second vertical cylindrical vessel to the swirl generator,
the second vertical cylindrical vessel and the swirl generator being arranged at least partly in the vertical cylindrical separation space of the first vertical cylindrical vessel so that the first vertical cylindrical vessel coaxially surrounds the second vertical cylindrical vessel and the swirl generator at least partly, and
the swirl generator being arranged above the liquid tank.

17. The scrubber according to claim 16, wherein
the top of the swirl generator has an upper axial inlet connected with and in fluid connection with the second lower end of the second vertical cylindrical vessel for receiving the stream of accelerated stream of liquid- and particles-laden gas from the second vertical cylindrical vessel,
the swirl generator having a blade arrangement for converting the stream of accelerated stream of liquid- and particles-laden gas into tangential streams of liquid- and particles-laden gas,
the blade arrangement being symmetrical with respect to the vertical cylindrical separation space of the first vertical cylindrical vessel, and
blade arrangement of the swirl generator terminating in gas openings in the form of radial outlets opening up into the vertical cylindrical separation space of the first vertical cylindrical vessel for discharging tangential streams of liquid- and particles-laden gas into the vertical cylindrical separation space of the first vertical cylindrical vessel to form said cyclonic streams liquid- and particles-laden gas in the vertical cylindrical separation space of the first vertical cylindrical vessel.

18. The scrubber according to claim 17, wherein
the top of the swirl generator except for the upper axial inlet is closed by means least one top cover.

19. The scrubber according to claim 17, wherein
the swirl generator has an at least partly open bottom in fluid connection with the liquid tank for discharging solid particles and liquid separated in the swirl generator from the swirl generator into the liquid tank.

20. The scrubber according to claim 17, wherein
the blade arrangement of the swirl generator comprises two blades each having a curved section, a first plane section having a side that is connected to the curved section, and a second plane section having a side that is connected at an angle to the first plane section, and
flow channels being formed between said two blades, each flow channel leading from the axial inlet of the swirl generator to a radial outlet of the swirl generator.

21. The scrubber according to claim 17, wherein
a circumferential space is between the swirl generator and the inner wall of the vertical cylindrical separation space of the first vertical cylindrical vessel.

22. The scrubber according to claim 16, wherein
an annular space is between the first vertical cylindrical vessel and the second vertical cylindrical vessel,
the swirl generator being arranged in the annular space between the first vertical cylindrical vessel and the second vertical cylindrical vessel for receiving the accelerated stream of liquid- and solid laden gas from the second vertical cylindrical vessel, and the swirl generator has a ring-shaped configuration and comprising a plurality of guide vanes for forming said cyclonic streams of liquid- and solid laden gas of the stream of said accelerated stream of liquid- and solid laden gas.

23. The scrubber according to claim 22, wherein a circumferential space is between the swirl generator and the inner wall of the vertical cylindrical separation space of the first vertical cylindrical vessel for allowing solid particles and liquid to flow past the swirl generator from a location above the swirl generator to the liquid tank below the swirl generator.

24. The scrubber according to claim 22, wherein the second lower end of the second vertical cylindrical vessel opens up into the vertical cylindrical separation space of the first vertical cylindrical vessel at a level below the swirl generator and at level above the liquid tank.

25. The scrubber according to claim 22, wherein the second lower end of the second vertical cylindrical vessel is in the form of a circular opening facing the liquid tank.

26. The scrubber according to claim 16, wherein a venturi cone is in the vertically oriented venturi channel, the venturi cone being axially movable to adjust the flow through the vertically oriented venturi channel.

27. The scrubber according to claim 16, wherein the gas outlet is formed tangentially in the first vertical cylindrical vessel.

28. The scrubber according to claim 16, wherein the swirl generator is at least partly open towards the liquid tank for discharging solid particles and liquid separated in the swirl generator into the liquid tank.

* * * * *